S. WOINA.
BOLT AND NUT LOCK.
APPLICATION FILED DEC. 4, 1916.
1,220,579.
Patented Mar. 27, 1917.
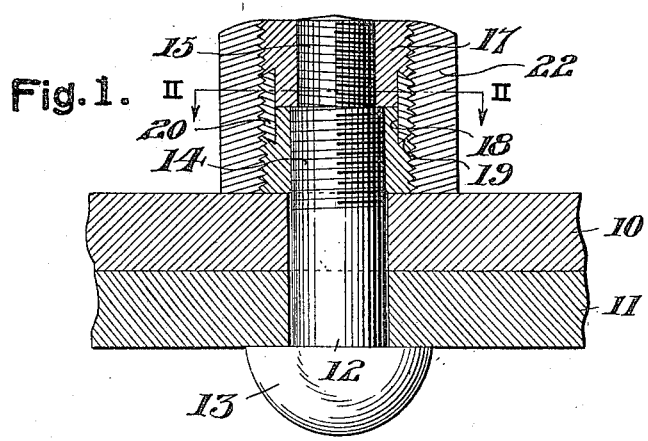
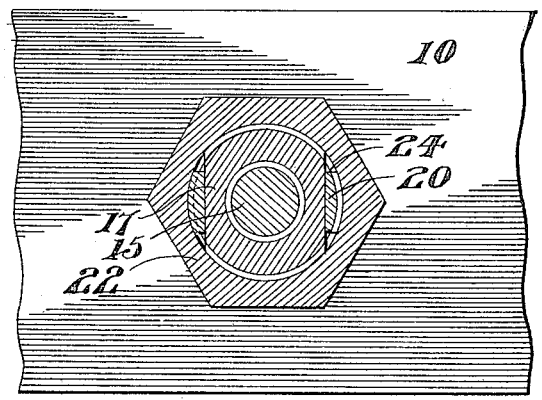
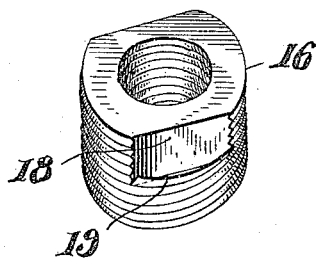
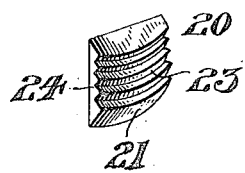
Inventor
S. Woina
By N. M. Wilson
Attorney

UNITED STATES PATENT OFFICE.

SYLVESTER WOINA, OF LOST CREEK, WEST VIRGINIA.

BOLT AND NUT LOCK.

1,220,579.

Specification of Letters Patent. Patented Mar. 27, 1917.

Application filed December 4, 1916. Serial No. 134,901.

*To all whom it may concern:*

Be it known that I, SYLVESTER WOINA, a subject of the Czar of Russia, residing at Lost Creek, in the county of Harrison and State of West Virginia, have invented certain new and useful Improvements in Bolt and Nut Locks, of which the following is a specification.

This invention relates to new and useful improvements in bolt and nut lock.

The primary object of the invention is the provision of a ready means for locking a bolt in engagement with the work and simultaneously locking a nut in engagement with the work, without having the bolt and nut in contact with each other.

A further object of the invention is the provision of a bolt having a threaded sleeve nut locked thereon, adapted for the reception of a usual form of retaining nut, maintaining the elements assembled in their locking arrangement upon the work.

A still further object of the device is the provision of a bolt having a plurality of sleeves arranged in threaded engagement thereon, means being provided for locking said sleeves together, whereby their removal from the bolt is prevented, a cover nut being carried by the device.

In the drawing forming a part of this application, and in which like-designated characters refer to corresponding parts throughout the several views, Figure 1 is a central sectional view through the device, operatively arranged upon the work, Fig. 2 is a transverse sectional view taken upon line II—II of Fig. 1, Fig. 3 is a perspective view of one of the sleeves detached, and Fig. 4 is a perspective view of one of the locking slides.

Referring more in detail to the drawing, the device, is herein illustrated in connection with two pieces of material 10 and 11, through which the shaft 12 of a bolt 13 extends for securing the same together, it being noted that the shaft 12 has a screw threaded portion 14 of the same diameter as the shaft and also a screw threaded terminal portion 15 somewhat reduced in diameter.

With the shaft 12 arranged through the work, a sleeve 16 is threaded upon the portion 14 of the bolt being firmly screwed down upon the adjacent faces of the member 10, while thereafter a similar sleeve 17, having a reduced threaded bore is screwed upon the shaft end 15 for engaging the adjacent end of the sleeve 16, it being noted that the screw threads of the portions 14 and 15 are of opposite pitch while the internal threads of the sleeves 16 and 17, respectively, are of corresponding arrangement.

Each of the said sleeves are provided with opposite flattened faces 18, each having one incut side 19, thereby forming opposite dovetailed grooves when the sleeves 16 and 17 are operatively positioned upon the shaft 12 with the faces 18 of the sleeves in alinement with each other. A locking slide 20 is provided for each of said grooves adapted to be readily positioned therein when the sleeves are so arranged upon the bolt, it being understood that the slides have oppositely inclined sides 21 for reception therein of the sides 19 of the sleeves.

Each of the sleeves 16 and 17 are provided exteriorly with similar screw threaded surfaces upon which the usual form of nut 22 is readily positioned, the said nut being adapted to overlie the slides 20 for engagement with the threaded outer faces 23 of such slides. The squared ends 24 of the slides 20 are spaced from the ends of the faces 18 of the sleeves so that a forced movement of the nut 22 over the said slides 20 when positioned within the aforementioned grooves tends to move the slides into wedging locking relations between the sleeves and said nut 22, thereby locking the said nut upon the sleeves and slides when the nut engages upon the work, as illustrated in Figs. 1 and 2 of the drawing. The shoulder 25 is illustrated in Fig. 1 and the inner end of the reduced portion 15 of the bolt shaft lying flush with the outer end of the sleeves 16, but it will be understood that this shoulder may be likewise positioned at any point within the inner sleeve 16, such for instance as where the work is of greater thickness than the members 10 and 11, herein illustrated. Without the employment of the nut 22, the sleeves are operatively locked in position by the slides 20, although such cover and binding nut, as well as retaining means, are also highly desirable.

What I claim as new is:—

1. A bolt retaining means comprising a threaded shaft having a reduced terminal portion provided with oppositely arranged threads from the said shaft, separate sleeves screwed upon the said threaded portions in contact with each other when operatively positioned, the said sleeves having dove-tailed slots in their outer faces adjacent the contacting ends, wedge slides removably positioned within the said slots, the said sleeves and slides having similar externally threaded faces and a retaining nut threaded upon the said sleeves and slides.

2. A device of the class described comprising a bolt having adjacent oppositely threaded portions, contacting members separately threaded upon the said portions, and locking means having dove-tailed connection with the said contacting members.

3. A device of the class described comprising a bolt having adjacent oppositely threaded portions, contacting members separately threaded upon the said portions, locking means having dove-tailed connection with said contacting members, and a cover nut for the said members having wedged engagement with the said means when the device is locked upon the work.

In testimony whereof I affix my signature.

SYLVESTER WOINA.

Copies of this patent may be obtained for five cents each, by addressing the "Commissioner of Patents, Washington, D. C."